Dec. 17, 1957  C. G. COMER ET AL  2,817,022
AUTOMATIC STARTING DEVICE
Filed April 16, 1956
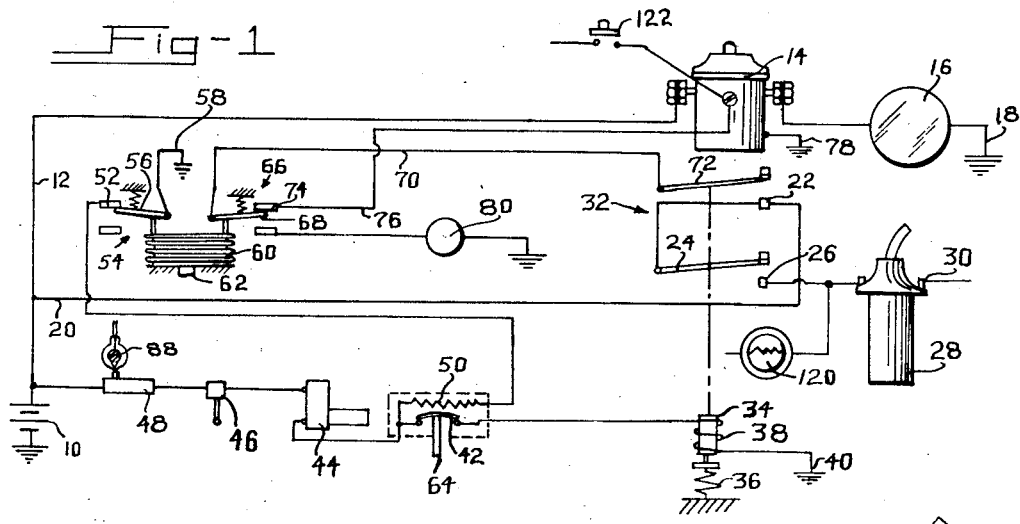
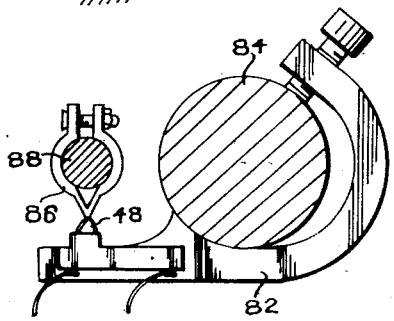
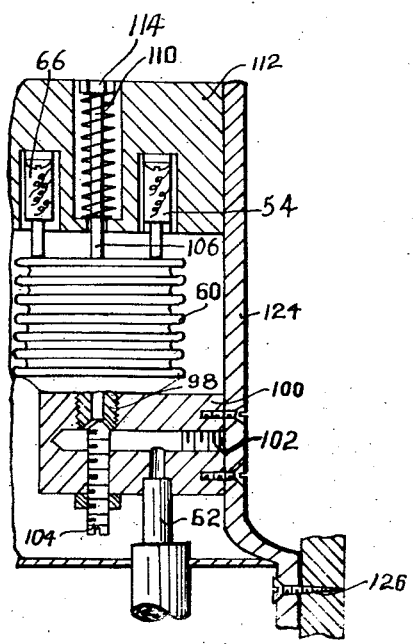
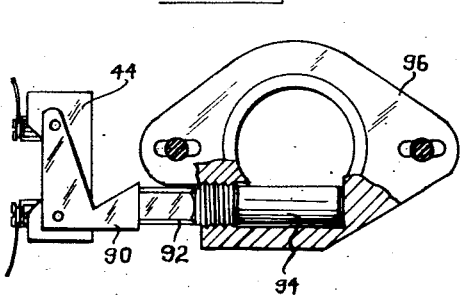
*INVENTOR.*
CURTIS G. COMER
EMIL A. BILLHIMER
BY Toulmin & Toulmin
ATTORNEYS

United States Patent Office 2,817,022
Patented Dec. 17, 1957

2,817,022

AUTOMATIC STARTING DEVICE

Curtis G. Comer, Vandalia, and Emil A. Billhimer, Troy, Ohio

Application April 16, 1956, Serial No. 578,225

6 Claims. (Cl. 290—2)

This invention relates to engine control devices, and in particular to a starting device for an internal combustion engine that is responsive to thermal conditions in the engine or associated part.

Internal combustion engines of the nature employed in passenger cars and trucks are generally of the water-cooled type, thus subject to freezing in cold weather unless an antifreeze is included in the water in the cooling system.

Such engines are also known to encounter their most severe wearing conditions when operating cold. It has been estimated that about 95% of all engine wear takes place during the first five minutes of engine operation due to improper lubrication of the moving parts.

Having the foregoing in mind, it is an object of the present invention to provide an automatic control system with an engine of the nature referred to which will maintain the said engine warm at all times, thereby eliminating the difficulties and drawbacks referred to above.

Another object of the present invention is the provision of an arrangement for automatically starting the internal combustion engine periodically whereby it is maintained warm, while including in the arrangement a control means for preventing the battery or other source of starting energy from becoming exhausted if the engine does not start properly.

A further object of the present invention is the provision of an arrangement for operating the heater of an automobile so that the interior of the car stays warm together with the engine.

It is also an object of the present invention to provide an automatic system of the nature referred to which is entirely automatic in operation, but which can be selectively adjusted to be operative or inoperative and which will not operate when the car is in gear.

The foregoing objects and advantages, as well as other objects and advantages of this invention, will become more apparent upon reference to the following specification taken in connection with the accompanying drawings, in which:

Figure 1 is a diagrammatic view showing a control system according to the present invention;

Figure 2 is a view partly in section showing the manner in which a thermostatic element is inserted in the cooling system of a vehicle for energizing and interrupting the running cycle of the engine;

Figure 3 is a sectional view showing the manner in which the control switch is included with the vehicle's shift lever or the like so that the vehicle must be shifted into neutral or parking gear before the system becomes operative; and Figure 4 is a sectional view showing a pressure responsive arrangement adapted for connection with the intake manifold of the engine so that when the engine starts switches are operated that will interrupt the circuit to the starter of the engine.

Referring to the drawings somewhat more in detail, in Figure 1 the battery of the vehicle is indicated at 10 and it is connected via wire 12 with one terminal of a solenoid-operated starter switch 14 which has its other terminal connected with a starter motor 16 that is also connected to ground as at 18. Closing of switch 14 will energize starter motor 16 to crank the engine.

There is also a wire 20 leading from the battery to a terminal 22 of a relay and thence to a movable contact arm 24 of the said relay. Contact arm 24 is adapted for closing on a contact 26 when the relay is energized, thereby effecting connection of the battery with one terminal of the ignition coil 28 of the engine; the other terminal of which, as at 30, leads to the breaker points of the ignition system.

The aforementioned relay, which is generally indicated in closing the dot-dash outline at 32, includes an armature 34 urged in one direction by a spring 36 and adapted for being drawn in another direction by energization of a coil 38. Coil 38 has one side grounded as at 40 and its other side connected through an overload switch 42; with one terminal connected with a thermostatic control switch 44 and the other terminal of which is connected with one side of a manual switch 46; the other side of which is connected with one side of a switch 48 that is under the control of the shift lever of the vehicle, and the other side of which is connected to the ungrounded side of battery 10.

Associated with overload switch 42 is the heater element 50; one side of which is connected with the battery side of switch 42 and the other side of which is connected with terminal 52 of a limit switch 54 that has a movable contact arm 56 which has one end grounded as at 58. Contact arm 56 is normally spaced from terminal 52 of the switch, but is held thereagainst when the pressure-sensitive bellows 60 is expanded due to a reduction of the suction therein.

This bellows is connected by a tube 62 with the intake manifold of the engine and when the suction in the manifold rises, indicating that the engine has started, the bellows collapses and this causes arm 56 of switch 54 to move away from terminal 52 thereof, interrupting the circuit through heater 50 and permitting opening of the overload switch 42.

If the engine does not start and switch 54 does not open after a delay of about five seconds the overload switch 42 will be snapped open due to the temperature attained by heater 50, and thereafter the system becomes inoperative until overload switch 42 is manually reset by the reset plunger 64.

Bellows 60 has associated therewith a switch 66 that has an arm 68 that has its one end connected by a wire 70 with movable contact arm 72 of relay 32 that is adapted when the relay is energized, to close on contact 22 thereby connecting the said arm 68 with the ungrounded side of battery 10 via wire 20.

When bellows 60 is expanded switch arm 68 closes on terminal 74 of switch 66 thereof, connecting arm 68 with terminal 76 of the actuating coil for solenoid-operated starter switch 14; the other side of the coil being grounded as at 78.

At this point it will be apparent that energization of relay 32 will bring about closing of starter switch 14 to energize starter motor 16 and also supply energy to the ignition system of the engine so that the engine will be cranked under starting conditions and, if all factors relating to starting of the engine will be in proper balance, the engine will start. When the engine does start contact arm 56 and switch 66 are actuated due to the collapsing of bellows 60, and this will de-energize starting switch 14 and the heater element 50, both for obvious reasons. Switch 66, in addition to de-energizing starter switch 14, will also energize motor 80 of the heater of the vehicle whereby the interior of the vehicle is maintained warm at all times.

The manual off-and-on switch 46 is preferably mounted within the engine cab beneath the dash, or some other suitable location, where the circuit of the present invention can be made selectively effective or ineffective. Switch 48 is arranged, as illustrated in Figure 3, on a bracket 82 which may be clamped on the steering column 84 with a cam operator 86 being attached to the shift lever 88, and so arranged that the nose of the cam will engage and close switch 48 only when the gearing of the car is shifted into neutral or park.

Control switch 44 of the system is mounted in a bracket arrangement 90, which is secured to an element 92 that includes a thermostatically sensitive portion 94 which is positioned so as to be sensitive to the temperature; for example, of the water in the cooling system of the vehicle or of the oil in the lubricating system over the vehicle, or some other portion of the engine that is at least generally indicative of the engine temperature that does not heat or cool at too rapid a cycle.

For example, we have found it quite satisfactory to locate the thermostatic element in a block 96 adapted to be placed in the outlet of the cooling system from the engine block or head and directly beneath the conventional thermostatic element which restricts the flow of water from the outlet until the temperature thereof reaches a predetermined amount.

Element 94 in that case would be arranged to be sensitive to a temperature somewhat less than that at which the thermostat opens. For example, with a 180° thermostat, the element 94 might be arranged to open switch 44 at, say, 150°, and to permit the said element to close at a temperature of somewhere between 75° and 100°. The block 96, and the parts immediately associated therewith could be suitably lagged in order to prevent too rapid cooling off that might cause too frequent starting of the engine.

Bellows 60 may advantageously be arranged, as illustrated in Figure 4, to show that the lower end of the bellows has a threaded neck 98, screw-threaded into block 100 which has a flow passage 102 therethrough, to which the suction tube 62 leading to the intake manifold of the engine is connected.

According to the present invention the rate of change in pressure within bellows 60 may be regulated by needle screw 104 so that the bellows does not collapse during ordinary cranking and does not instantaneously open should the engine miss immediately after being started.

The threaded connection of the bellows in block 100 anchors the lower end thereof so that the upper end of the bellows 106 moves up and down in response to changes in pressure therein. This upper end of the bellows may be spring-biased as by spring 108 surrounding rod 110 connected with the upper end of the bellows, and which rod extends into a block 112. In this manner the particular characteristics of the bellows can be adjusted by the spring 108 and by adjusting the abutment nuts 114.

Block 112 will be availed of for mounting the switches 54 and 66 so that their actuating plungers are engaged by the upper end of bellows 60, as shown in Figure 4.

It will be evident that the system of the present invention is arranged so that it is entirely independent of the conventional ignition system of a vehicle and of the conventional starting system. For example, the conventional key-operated ignition switch is indicated at 120 in Figure 1, and a conventional starter switch is indicated at 122; neither of these switches is in any way affected by the system of this invention, and vice versa.

It will also be apparent that the system of the present invention is split up into independent circuits, with there being separate circuits for the starter motor, ignition system, and relay system so that a fault in one of the systems will not require replacement of any of the other systems and also makes it simpler to service the entire arrangement.

It will also be evident that the entire system, with the exception of the manual switch 46, the shift lever-operated switch 48, and the thermostatically-operated switch 44, can be contained within a frame that can be mounted on the fire wall of an engine compartment.

The back panel of the frame is indicated at 124 in Figure 4, and this back panel is adapted for fastening to the fire wall as by screws 126 and will support the bellows 60, the switches 54 and 66, the relay 32, and the overload switch 42. A suitable cover mounted on the back panel 124 encloses the various elements so that they are protected from dirt and oil vapors and the like.

The system, according to the present invention, is simple to install in a vehicle and is substantially trouble-free and will operate for long periods of time without attention.

It will be understood that this invention is susceptible to modification in order to adapt it to different usages and conditions, and accordingly it is desired to comprehend such modifications within this invention as may fall within the scope of the appended claims.

We claim:

1. In combination; an internal combustion engine having an electric ignition system, an electric starting motor for the engine, and an automatic starting system comprising, a solenoid-operated switch for the said starting motor, a relay energizable for closing a first circuit to the solenoid of said switch and a second circuit to the ignition system of the engine, a third circuit for energizing said relay, a delay switch in said third circuit having temperature sensitive means responsive to a predetermined temperature for opening the circuit to de-energize said relay, a heater element for said temperature sensitive means energizable simultaneously with said third circuit operable a predetermined time after energization thereof to develop said predetermined temperature, and switch means operable in response to running conditions of said engine for opening said first circuit and the circuit through said heater element.

2. In combination; in a vehicle having a passenger compartment and a driving engine, an electric ignition system for the engine, an electric starting motor for the engine, a heater for the passenger compartment of the vehicle and a motor associated with the heater for circulating air through the compartment, and an automatic engine starting system comprising; a solenoid-operated switch for the said starting motor, a relay energizable for closing a first circuit to the solenoid of said switch and a second circuit to the ignition system of the engine, a third circuit for energizing said relay, a delay switch in said third circuit having temperature sensitive means responsive to a predetermined temperature for opening the circuit to de-energize said relay, a heater element for said temperature sensitive means energizable simultaneously with said third circuit operable a predetermined time after energization thereof to develop said predetermined temperature, said switch means operable in response to running conditions of said engine for opening said first circuit and the circuit through said heater element, said last mentioned switch means also being operative to close a circuit to the heater motor of the vehicle when the engine starts.

3. In combination; an internal combustion engine having an electric ignition system and an electric starting motor, and an automatic starting system for the engine comprising; a solenoid-operated switch for the said starting motor, a relay energizable for closing a first circuit to the solenoid of said switch and a second circuit to the ignition system of the engine, a third circuit for energizing said relay, a delay switch in said third circuit having temperature sensitive means responsive to a predetermined temperature for opening the circuit to de-energize said relay, a heater element for said temperature sensitive means energizable simultaneously with said third circuit operable a predetermined time after energization thereof to develop said predetermined temperature, and switch means operable in response to running conditions of said engine for opening said first circuit and the circuit through said heater element, said relay switch having manual reset means and being closable solely by this means.

4. In combination; an internal combustion engine having an electric ignition system, an electric starting motor for the engine, a transmission driven by the engine having a gear selector, and an automatic engine starting system comprising; a solenoid-operated switch for the said starting motor, a relay energizable for closing a first circuit to the solenoid of said switch and a second circuit to the ignition system of the engine, a third circuit for energizing said relay, a delay switch in said third circuit having temperature sensitive means responsive to a predetermined temperature for opening the circuit to de-energize said relay, a heater element for said temperature sensitive means energizable simultaneously with said third circuit operable a predetermined time after energization thereof to develop said predetermined temperature, and switch means operable in response to running conditions of said engine for opening said first circuit and the circuit through said heater element, said delay switch having manual reset means and being closable solely by this means, said third circuit including in series therein a manually operable switch, a switch closable only when the gear selector of the transmission is out of drive position, and a thermal switch sensitive to the temperature of a predetermined portion of the engine operable to close at a predetermined lower temperature and open at a predetermined higher temperature.

5. In combination; an internal combustion engine having a liquid cooling system, a thermostat for controlling fluid flow in the system, an electric starting motor for the engine, an electric ignition system for the engine, a transmission driven by the engine having a gear selector, a solenoid-operated switch operable for energizing the starting motor, a relay energizable for closing a first circuit to the solenoid of said switch and a second circuit to the ignition system of the engine, a third circuit for energizing said relay, a delay switch in said third circuit having temperature sensitive means responsive to a predetermined temperature for opening the circuit to de-energize said relay, a heater element for said temperature sensitive means energizable simultaneously with said third circuit operable a predetermined time after energization thereof to develop said predetermined temperature, switch means operable in response to running conditions of said engine for opening said first circuit and the circuit through said heater element, said delay switch having manual reset means and being closable solely by this means, said third circuit including in series therein a manually operable switch, a switch closable only when the gear selector of the car is out of drive position, and a thermal switch sensitive to the temperature of a predetermined portion of the engine operable to close at a predetermined lower temperature and open at a predetermined higher temperature, said thermal switch being mounted immediately adjacent the thermostat in the cooling system of the engine on the engine side thereof and being adapted for opening at a temperature lower than the temperature at which the thermostat opens.

6. A combination of an internal combustion engine and a thermostatically controlled automatic engine starting system associated therewith according to claim 5 in which there is a block mounted in the engine cooling system and which block is adapted for supporting the thermostat of the cooling system and said thermal switch being mounted in said block.

References Cited in the file of this patent
UNITED STATES PATENTS

| | | |
|---|---|---|
| 2,579,958 | Perhats | Dec. 25, 1951 |
| 2,606,298 | Merritt | Aug. 5, 1952 |
| 2,607,013 | Drummond | Aug. 12, 1952 |
| 2,650,987 | Doyle | Sept. 1, 1953 |
| 2,691,110 | Lincoln | Oct. 5, 1954 |
| 2,698,391 | Braden et al. | Dec. 28, 1954 |
| 2,717,317 | Scott | Sept. 6, 1955 |